(12) United States Patent
Zoican-Loebick et al.

(10) Patent No.: US 12,103,365 B1
(45) Date of Patent: Oct. 1, 2024

(54) SYSTEM FOR DEHUMIDIFICATION OF A VEHICLE INTERIOR

(71) Applicant: Precision Combustion, Inc., North Haven, CT (US)

(72) Inventors: Codruta Maria Zoican-Loebick, North Haven, CT (US); Christian Junaedi, Cheshire, CT (US); Julian Prada, Philadelphia, PA (US); Subir Roychoudhury, Madison, CT (US)

(73) Assignee: PRECISION COMBUSTION, INC., North Haven, CT (US)

( * ) Notice: Subject to any disclaimer, the term of this patent is extended or adjusted under 35 U.S.C. 154(b) by 318 days.

(21) Appl. No.: 17/695,320

(22) Filed: Mar. 15, 2022

Related U.S. Application Data

(60) Provisional application No. 63/162,611, filed on Mar. 18, 2021.

(51) Int. Cl.
*B60H 3/02* (2006.01)

(52) U.S. Cl.
CPC ....... *B60H 3/024* (2013.01); *B60H 2003/028* (2013.01)

(58) Field of Classification Search
CPC ...... B01D 2259/40096; B01D 2201/58; B01D 2201/586; B01D 53/261; F24F 2003/144; B60H 2003/028; B60H 3/024
See application file for complete search history.

(56) References Cited

U.S. PATENT DOCUMENTS

| | | | |
|---|---|---|---|
| 5,051,241 A | 9/1991 | Pfefferle | |
| 6,156,444 A | 12/2000 | Smith | |
| 6,746,557 B2 | 6/2004 | Durand | |
| 7,141,092 B1 * | 11/2006 | Roychoudhury | .. B01D 53/0431 |
| | | | 95/148 |
| 7,504,047 B2 | 3/2009 | Castaldi | |
| 7,964,023 B2 | 6/2011 | Zhu | |
| 10,464,044 B1 | 11/2019 | Loebick | |
| 10,994,241 B1 | 5/2021 | Junaedi | |
| 11,015,128 B1 | 5/2021 | Loebick | |
| 2010/0281904 A1 * | 11/2010 | Yokomachi | ............ B60H 3/024 |
| | | | 165/104.34 |

(Continued)

FOREIGN PATENT DOCUMENTS

CN 110716600 A * 1/2020 ............. G05D 27/02

OTHER PUBLICATIONS

CN-110716600-A Translation (Year: 2020).*

*Primary Examiner* — Schyler S Sanks

(74) *Attorney, Agent, or Firm* — Andrew D. Gathy

(57) ABSTRACT

A dehumidification system comprising an enclosure having sidewalls, the sidewalls defining a cavity; an inlet fluidly coupled to the cavity, the inlet configured to receive air into the cavity; an outlet fluidly coupled to the cavity, the outlet configured to discharge the air from the cavity; a sorbent bed located within the cavity fluidly coupled to the inlet and the outlet; the sorbent bed comprising a substrate with dehumidification materials attached to the substrate and coupled to an insulator; a regenerable power source electrically coupled to the substrate configured to electrically heat the substrate to a predetermined temperature configured to regenerate the sorbent bed and a blower fluidly coupled to the inlet and the outlet, the blower configured to transfer air from the inlet through the sorbent bed and out the outlet.

21 Claims, 4 Drawing Sheets

(56) References Cited

U.S. PATENT DOCUMENTS

| | | | |
|---|---|---|---|
| 2013/0220906 A1* | 8/2013 | Stenhouse | E03B 3/28 165/80.1 |
| 2022/0111350 A1 | 4/2022 | Weissman | |

* cited by examiner

SYSTEM FOR DEHUMIDIFICATION OF A VEHICLE INTERIOR

CROSS-REFERENCE TO RELATED APPLICATIONS

This application claims benefit of U.S. provisional application No. 63/162,611, filed Mar. 18, 2021, incorporated in its entirety herein by reference.

GOVERNMENT RIGHTS

The invention was made with support from the United States Government under Contract no. W56HZV19C0116, sponsored by the Department of Defense.

BACKGROUND

The present disclosure is directed to a system and process for dehumidification of combat vehicles interior by recirculating cabin air through a sorbent bed having a structured support material coated with sorbents that remove moisture from the cabin air. The structured support material can be a metal mesh, metal or ceramic foam, metal fiber, ceramic fiber, and the like.

Combat vehicles under long term storage suffer negative effects of exposure to humidity. Particularly, corrosion, mold and fungal growth can occur inside the vehicle cabin due to the condensation of water vapor as a result of environmental temperature fluctuation. Traditional dehumidification systems are not ideal in this application. Desiccant bags require frequent changing since it is not regenerable. Compressor-based traditional dehumidifier systems require energy upwards of 1000 Wh daily to maintain the humidity inside the vehicle at acceptable levels (under or around 50%).

What is needed is a dehumidification system that circumvents these disadvantages by operating as a compact and efficient regenerable photovoltaic-powered system at a considerably lower energetic footprint allowing for long-term unattended, untethered, carbon-neutral, humidity control of a combat vehicle interior.

SUMMARY

In accordance with the present disclosure, there is provided a dehumidification system comprising an enclosure having sidewalls, the sidewalls defining a cavity; an inlet fluidly coupled to the cavity, the inlet configured to receive air into the cavity; an outlet fluidly coupled to the cavity, the outlet configured to discharge the air from the cavity; a sorbent bed located within the cavity fluidly coupled to the inlet and the outlet; the sorbent bed comprising a substrate with dehumidification materials attached to the substrate and an insulator coupled to the substrate; a blower fluidly coupled to the inlet and the outlet, the blower configured to transfer air from the inlet through the sorbent bed and out the outlet; and a regenerable power source electrically coupled to the substrate configured to electrically heat the substrate to a predetermined temperature configured to regenerate the sorbent bed.

A further embodiment of any of the foregoing embodiments may additionally and/or alternatively include the dehumidification materials are configured to dehumidify air.

A further embodiment of any of the foregoing embodiments may additionally and/or alternatively include the dehumidification materials comprise sorbent materials configured for removing moisture from air.

A further embodiment of any of the foregoing embodiments may additionally and/or alternatively include the substrate comprises at least one of a mesh and a nano fiber support and combinations thereof.

A further embodiment of any of the foregoing embodiments may additionally and/or alternatively include the insulator comprises the dehumidification material.

A further embodiment of any of the foregoing embodiments may additionally and/or alternatively include the substrate comprises an ultra-short-channel-length metal substrate.

A further embodiment of any of the foregoing embodiments may additionally and/or alternatively include the regenerable power source comprises a rechargeable battery coupled with a solar tarp or a solar panel.

In accordance with the present disclosure, there is provided a vehicle equipped with a dehumidification system comprising a vehicle comprising a cabin, the cabin defining an interior and an exterior; an enclosure having sidewalls, the sidewalls defining a cavity; an inlet fluidly coupled to the cavity, the inlet configured to receive air into the cavity from at least one of the interior of the cabin and the exterior of the cabin; an outlet fluidly coupled to the cavity, the outlet configured to discharge the air from the cavity into the cabin interior; a sorbent bed located within the cavity fluidly coupled to the inlet and the outlet; the sorbent bed comprising a substrate with dehumidification material attached to the substrate and an insulator coupled to the substrate; a blower fluidly coupled to the inlet and the outlet, the blower configured to transfer the air from the inlet through the sorbent bed and out the outlet; and a regenerable power source electrically coupled to the substrate configured to electrically heat the substrate to a predetermined temperature configured to regenerate the sorbent bed.

A further embodiment of any of the foregoing embodiments may additionally and/or alternatively include the dehumidification materials comprise sorbent material.

A further embodiment of any of the foregoing embodiments may additionally and/or alternatively include the substrate comprises layers of at least one of a mesh and a nano fiber support and combinations thereof.

A further embodiment of any of the foregoing embodiments may additionally and/or alternatively include a controller coupled to the blower and the substrate, the controller configured to receive signals from at least one of a humidistat and a thermocouple.

A further embodiment of any of the foregoing embodiments may additionally and/or alternatively include the substrate comprises an ultra-short-channel-length metal substrate.

A further embodiment of any of the foregoing embodiments may additionally and/or alternatively include the regenerable power source comprises a rechargeable battery coupled with a solar tarps or a solar panel.

In accordance with the present disclosure, there is provided a process for dehumidification of a space comprising fluidly coupling a dehumidification system to the space, the dehumidification system comprising an enclosure having sidewalls, the sidewalls defining a cavity; an inlet fluidly coupled to the cavity, the inlet configured to receive air into the cavity; an outlet fluidly coupled to the cavity, the outlet configured to discharge the air from the cavity into the space; a sorbent bed located within the cavity fluidly coupled to the inlet and the outlet; the sorbent bed comprising a substrate with dehumidification material attached to the substrate and an insulator coupled to the substrate; a blower fluidly coupled to the inlet and the outlet, the blower configured to transfer the air from the inlet through the sorbent bed and out the outlet into the space; and a regenerable power source electrically coupled to the substrate; activating the blower; directing the air through the sorbent bed; contacting the air with the dehumidification material; removing humidity contained in the air; and discharging the air from the outlet into the space.

A further embodiment of any of the foregoing embodiments may additionally and/or alternatively include the dehumidification materials comprise sorbent materials.

A further embodiment of any of the foregoing embodiments may additionally and/or alternatively include the substrate comprises at least one of a mesh and a nano fiber support and combinations thereof.

A further embodiment of any of the foregoing embodiments may additionally and/or alternatively include the substrate comprises an ultra-short-channel-length metal substrate.

A further embodiment of any of the foregoing embodiments may additionally and/or alternatively include the process further comprising regenerating the sorbent bed by resistively heating the substrate and purging a portion of the moisture laden air to an exterior of the space.

A further embodiment of any of the foregoing embodiments may additionally and/or alternatively include the process further comprising electrically heating the substrate, to a predetermined temperature responsive to a predetermined relative humidity in the space, with the regenerable power source electrically coupled to the substrate.

A further embodiment of any of the foregoing embodiments may additionally and/or alternatively include the space is selected from the group consisting of a vehicle cabin, a ship cabin, and an aircraft cabin.

A further embodiment of any of the foregoing embodiments may additionally and/or alternatively include the rechargeable power source is configured to charge a vehicle battery responsive to a demand for power to the substrate for resistive heating.

A further embodiment of any of the foregoing embodiments may additionally and/or alternatively include regenerating the sorbent bed by utilizing exterior air, during the driest part of the day and/or when the air is detected to be below a predetermined RH level, for regeneration or as make-up air.

The disclosure includes a process for actively dehumidifying combat vehicle interiors while the vehicle is under long-term storage. The process includes contacting the humid air inside the vehicle cabin with a bed of sorbent coated on a structured support material. The structured support material can be a metal mesh, metal or ceramic foam, metal fiber, ceramic fiber, and the like. Upon contact of the humid air with the sorbent, the moisture is retained by the sorbent. The dehumidified air is recirculated back into the vehicle. The moisture is retained by the sorbent. The dehumidified air is recirculated back into the vehicle. Periodically, the sorbent bed is thermally regenerated to release the moisture adsorbed by the sorbent. The accumulated moisture is vented outside the vehicle using an additional interface between the vehicle interior and the outside atmosphere. Energy for operating the system is provided by a solar array and an energy storage device, such as rechargeable battery pack, traditional IC engine generator, fuel cells or any other available power source. When integrating the low-power dehumidification system with a solar array as the energy source and a battery pack as the energy storage device, the capability to provide the dehumidification solution using renewable energy (with zero carbon footprint) has been demonstrated.

Other details of the dehumidification system and process are set forth in the following detailed description and the accompanying drawings wherein like reference numerals depict like elements.

DETAILED DESCRIPTION

Figure 1:
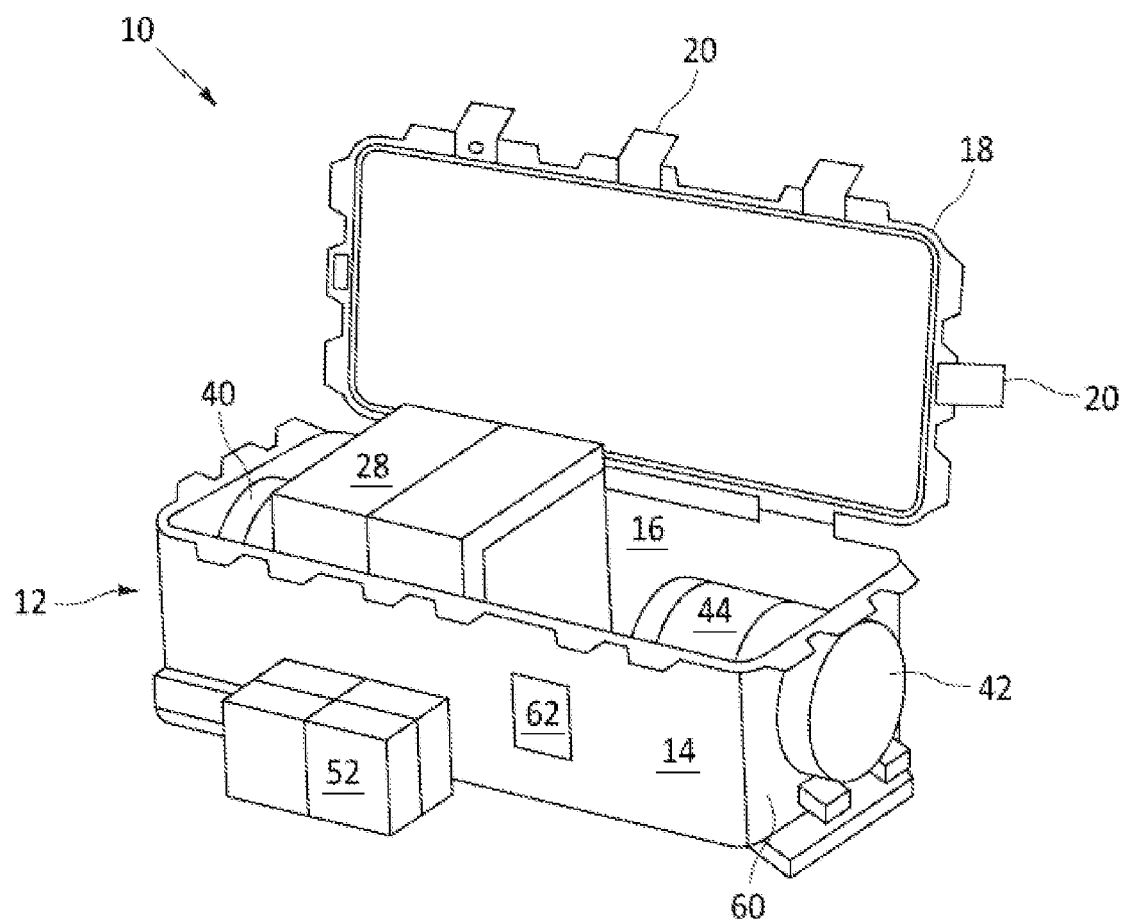
FIG. 1 is an exemplary dehumidification system.
Figure 2:
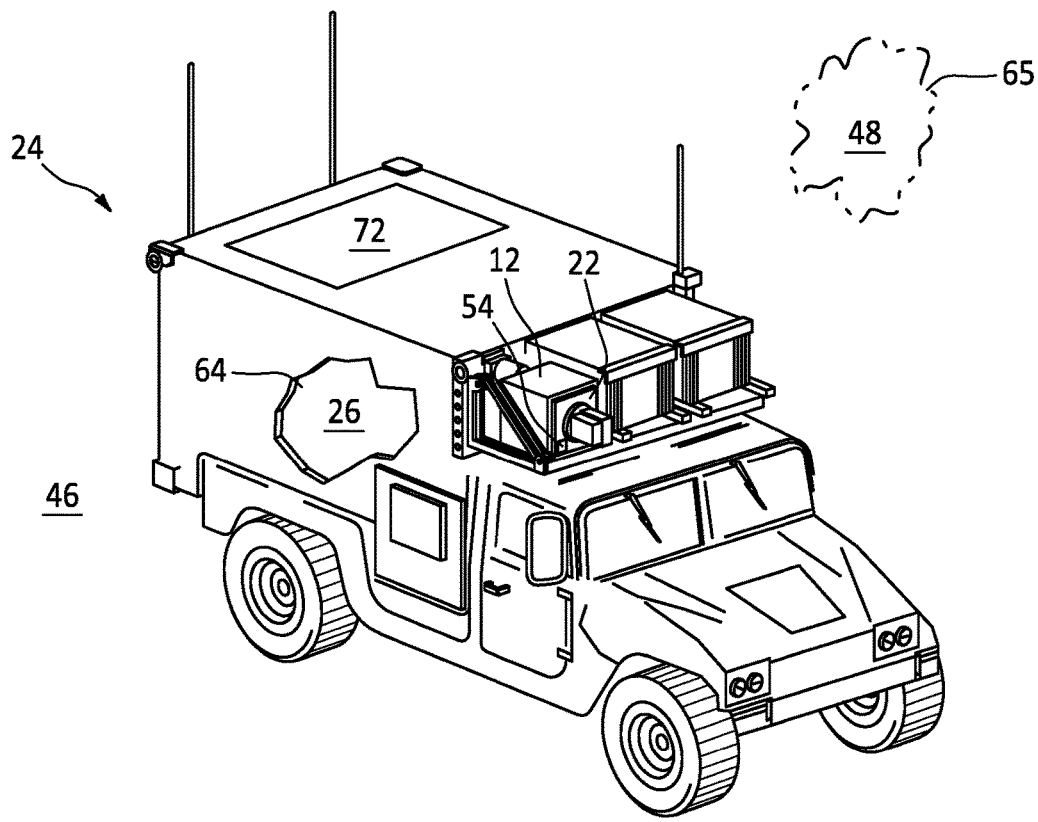
FIG. 2 is an exemplary vehicle equipped with an exemplary dehumidification system.

Referring now to FIG. 1 and FIG. 2, an exemplary dehumidification system 10 is shown. The dehumidification system 10 includes an enclosure 12 having sidewalls 14 forming a cavity 16. The sidewalls 14 can include a removable cover 18 for access to the cavity 16. In an exemplary embodiment, the cover 18 can include latches 20 for latching the cover 18 to the sidewalls 14. In an exemplary embodiment the enclosure 12 can be formed as a rectilinear shape, a tubular shape, a spherical shape and the like. In another exemplary embodiment, the enclosure 12 can be made unitary with a component 22 of a vehicle 24 as shown in FIG. 2. The enclosure 12 can be in fluid communication with an interior or cabin 26 of the vehicle 24.

Figure 3:
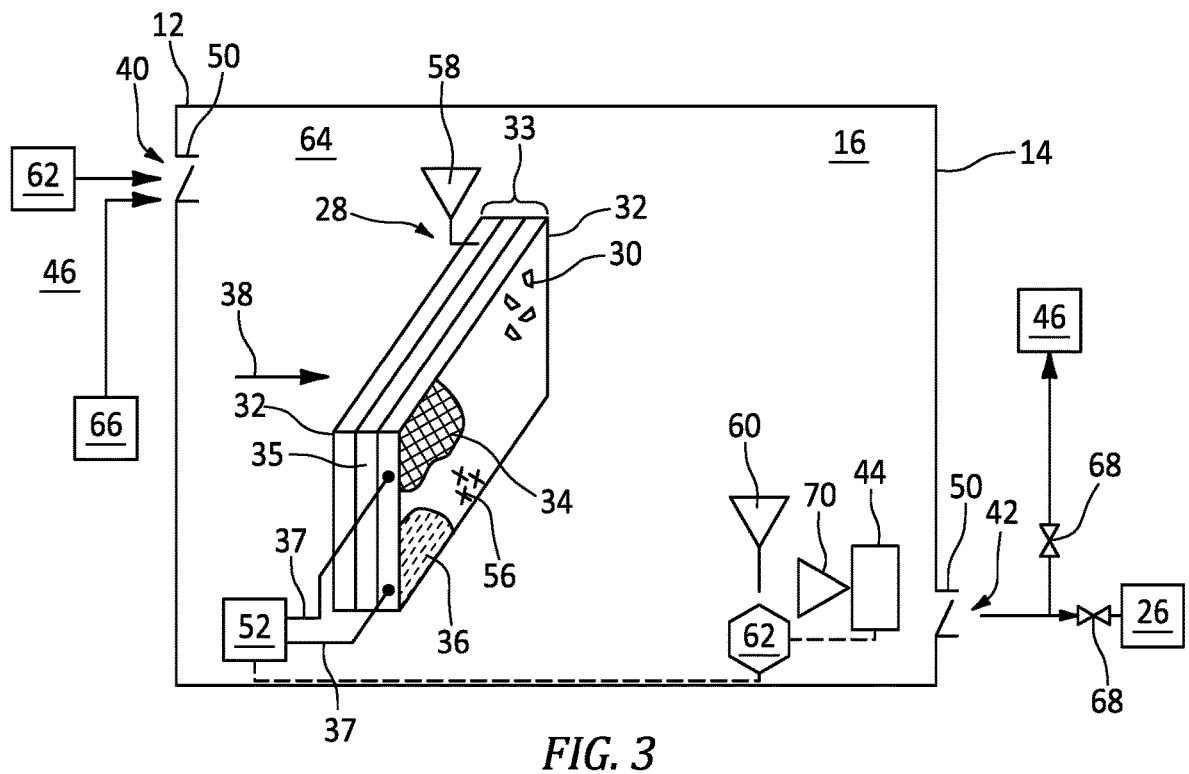
FIG. 3 is a schematic diagram of an exemplary dehumidification system.
Figure 4:
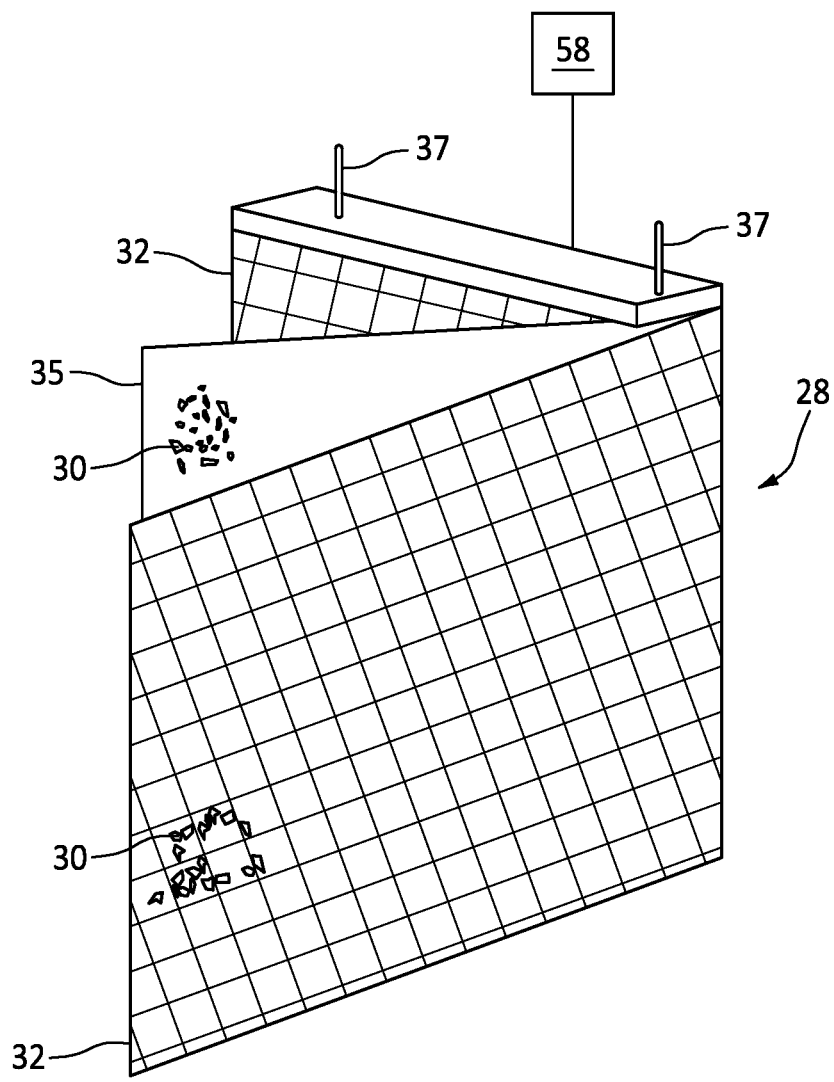
FIG. 4 is a schematic diagram of an exemplary sorbent bed used in the dehumidification system.

Referring also to FIG. 3 and FIG. 4, the enclosure 12 can include a sorbent bed 28 comprising dehumidification materials 30 such as sorbents coated on a substrate 32. The sorbent bed 28 can be formed in layers 33. The dehumidification material 30 can be coated on the substrate 32. An insulator, such as a ceramic mesh 35 can be interlaid between the substrates 32 with the ends of the substrate 32 welded to electrodes 37. The ceramic mesh 35 can also be coated with sorbent 30. The electrodes 37 can be utilized to conduct electrical energy. The substrate 32 can include a mesh 34 or a nano fiber support 36 or any combination thereof. The mesh elements 34 or fiber support 36 can be deployed horizontally or radially relative a direction of air flow 38 within the enclosure 12.

The dehumidification material 30 can include sorbent materials, deposited on an ultra-short-channel-length metal substrate 32. It is understood that any short contact time substrate made of ceramic or metal, such as the MICROLITH® brand substrate 32 can be utilized. The deposition of the dehumidification material 30 onto the metal substrate 32 can be implemented by various methods. Alternatively, finished dehumidification materials 30 deposited and bound to an ultra-short-channel-length metal substrate 32 can be purchased commercially from Precision Combustion, Inc., North Haven, Connecticut. The metal substrate 32 is preferably employed in a mesh 34 or fiber support 36 form; but the substrate 32 is not limited to such structures, and other structures may be suitable.

In another embodiment, the dehumidification material 30 comprises one or more, sorbent materials deposited on a MICROLITH® brand ultra-short-channel-length metal mesh 34 substrate 32. The metal mesh 34 is constructed from any conductive metal or combination of metals provided that the resulting structure is capable of withstanding the temperatures and chemical environment to which it is exposed. Suitable non-limiting materials of construction for the metal mesh 34 include iron-chromium alloys, iron-chromium-aluminum alloys, and iron-chromium-nickel alloys. Such metal meshes 34 are available commercially, for example, from Alpha Aesar and Petro Wire & Steel. The MICROLITH® brand substrate 32 can be obtained commercially from Precision Combustion, Inc., noted hereinabove. A description of the technology can be found, for example, in U.S. Pat. No. 5,051,241, incorporated herein by reference. Generally, the design comprises ultra-short-channel-length, low thermal mass metal monoliths that contrast with prior art monoliths having longer channel lengths. For the purposes of this invention, the term "ultra-short-channel-length" refers to channel lengths in a range from about 25 microns ($\mu$m) (0.001 inch) to about 500 $\mu$m (0.02 inch). Thus, in visual appearance the preferred metal mesh substrate 32 of ultra-short-channel-length looks like a reticulated net or screen. In contrast, the term "long channels" pertaining to prior art monoliths refers to channel lengths greater than about 5 mm (0.20 inch) upwards of 127 mm (5 inches). (Note that the channel length of the substrate is not to be confused with the length of the sorbent bed. The two lengths are different in kind and degree.)

As compared with prior art monolithic substrates, the preferred MICROLITH® brand ultra-short-channel-length metal mesh substrate facilitates packing more active surface area into a smaller volume and provides increased reactive area for a given pressure drop. Whereas in honeycomb monoliths having conventional long channels, a fully developed boundary layer is present over a considerable length of the channels; in contrast, the ultra-short-channel-length characteristic of the preferred sorbent of this invention avoids boundary layer buildup. Since heat and mass transfer coefficients depend on boundary layer thickness, avoiding boundary layer buildup enhances transport properties. The advantages of employing the ultra-short-channel-length metal substrate, and preferably, the MICROLITH® brand thereof, to control and limit the development of a boundary layer of a fluid passing there through is described in U.S. Pat. No. 7,504,047, which is a Continuation-In-Part of U.S. Pat. No. 6,746,657 to Castaldi, both patents incorporated herein by reference.

The ultra-short-channel-length metal substrate 32 employed in this invention can be provided in any configuration or structure, provided that the dehumidification process of this invention is operable. One alternative configuration comprises a coil (or coiled configuration) in which a sheet of metal mesh 34 is rolled on itself to provide for a radial flow path from an inlet of inner diameter to an outlet of larger outer diameter. The insulator 35 can be configured within the coil to insulate the metal mesh 34. The insulator, such as a ceramic mesh 35 can also be coated with the dehumidification material 30. Alternatively, the dehumidification material 30 can be employed as a sheet or a plurality of metal mesh layers 34 stacked, typically, in an orderly-pile one on the other. In the stacked sorbent bed 28, the number of layers 33 advantageously ranges from 2 to about 500 or more. The stack of layers 33 is typically compressed to reduce or minimize void spaces between each layer. In the coiled or stack configuration, the plurality of metal mesh layers 33 provides for a plurality of void spaces in random order. For the purposes of this invention, the term "sorbent bed" comprises the entire assembly, e.g., coil or stack, of substrate (s).

More specifically, the MICROLITH® brand metal mesh typically is configured with a plurality of pores having a diameter ranging from about 0.25 millimeters (mm) to about 1.0 mm, with a void space greater than about 60 percent, preferably up to about 80 percent or more. A ratio of channel length to diameter is generally less than about 2:1, preferably less than about 1:1, and more preferably, less than about 0.5:1. Preferably, the ultra-short-channel-length metal mesh 34 has a cell density ranging from about 100 to about 1,000 cells or flow paths per square centimeter. The ultra-short-channel-length metal mesh 34 can be constructed as disclosed, for example, in U.S. Pat. No. 6,156,444, incorporated herein by reference.

In another embodiment, the one or more layers of metal mesh are replaced by a porous metal fiber support 36 comprising a three-dimensional interconnected network of solid struts defining a plurality of pores of an open-cell configuration. The pores can have any shape or diameter; but typically, the number of pores that subtend one inch designate a "pore size," which for most purposes ranges from about 5 to about 40 pores per inch. The relative density of such fiber supports, taken as the density of the fiber support divided by the density of solid parent material of the struts, typically ranges from about 2 to about 15 percent. Porous metal fiber supports 36 are commercially available in a variety of alloys capable of withstanding the operating temperatures of the dehumidification process.

The air 38 can be drawn into the enclosure 12 through at least one inlet 40 and discharged out of the enclosure through an outlet 42 and/or recirculated through the enclosure 12 with a blower 44. The outlet 42 can be fluidly coupled to the vehicle interior 26. The inlet 40 can be fluidly coupled to the vehicle interior 26 and configured to deliver humid air 48 to the cavity 16 of the enclosure 12 for contact with the sorbent bed 28. The humid air 48 can be located at the exterior 46 and/or the vehicle interior 26. Valves or louvers 50 can be fluidly coupled to the inlet 40 and/or outlet 42 to control the flow of the air 38, 48. It is contemplated that the present disclosure can be extended to all cabin interiors where humid conditions exist, such as a Navy fleet, aircraft, public transportation, office space and the like.

In an exemplary embodiment, the substrate 32 can be connected to the electrode terminals 37 to allow for resistive heating. The power to resistively heat the substrate 32 can be supplied by a regenerable/rechargeable power source or simply a power source 52, such as a battery pack, a solar array, other available power source (e.g. a generator, a fuel cell, and the like). In an exemplary embodiment the electrode terminals 37 can be connected to the vehicle's electrical system 54 during operation. It is contemplated that the rechargeable power source 52 can be utilized to provide power to the vehicle battery responsive to the demand for power to the substrate 32 for resistive heating.

In another exemplary embodiment, the substrate 32 of metallic mesh 34 or nano fibers 36 can be restively heated to temperatures that are known to regenerate the sorbent bed 28, for example, the temperature should be a minimum of 100 degrees Centigrade (° C.), and a more preferable a temperature of 120° C. to regenerate the sorbent bed 28 in a predetermined time.

The dehumidification material 30 inside the sorbent bed 28 can include sorbent materials 56. In an exemplary embodiment the sorbent materials 56 can include (but not limited to) a molecular sieve (e.g. MS5A, MS3A) a zeolite (e.g. zeolite 13X), a metal organic framework (e.g. Mg-MOF177), activated carbon, silica, a polymer or a hydrogel coated directly on the substrate 32, to increase available surface area for contacting the air 38, 48.

The humid air 38, 48 (with relative humidity over 50%, and more preferably between 70% and 90%) can be actively passed through the sorbent bed 28 with the blower 44 at flow rates of up to 400 cubic feet per minute (CFM) and more preferably between 100-200 CFM. The blower 44 can be powered by the same power source 52 that is used to restively heat the sorbent bed 28. Alternatively, the blower 44 can have a separate power source, such as a solar array 72. A thermocouple 58 and humidistat 60 can be used to provide control inputs for a controller 62 coupled to the substrate 32 and blower 44 to regulate the dehumidification operation and sorbent regeneration of the dehumidification system 10.

Figure 5:
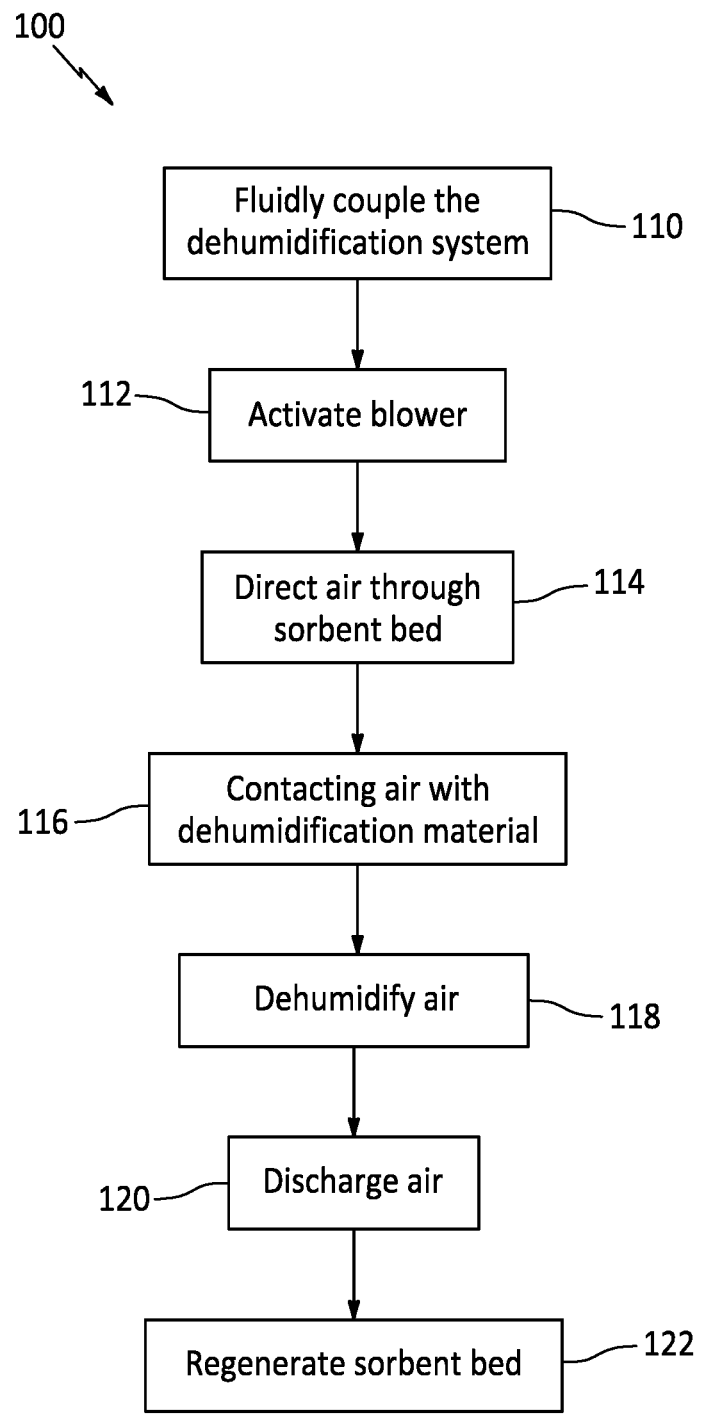
FIG. 5 is a process diagram of an exemplary dehumidification process.

Referring to FIG. 5, a process diagram 100 is shown. The dehumidification system 10 can be employed in a variety of locations associated with unwanted interior humidity 64, such as the vehicle 24. At step 110 the dehumidification system 10 is fluidly coupled to a space 62 to be dehumidified, such as the vehicle cabin 26. The inlet 40 and/or outlet 42 can be fluidly coupled with the cabin 26. Alternatively, the entire dehumidification system 10 can be located within the cabin 26. In another alternative embodiment, the dehumidification system 10 can be integrated into the existing vehicle interior air treatment system, such as component 22 to utilize the vehicle blower and ductwork. The component 22, can be an auxiliary air conditioning system, a cabin air heater/window defroster system and the like. The dehumidification approach can also reduce cooling loads in air-conditioning systems making them more efficient. At step 112, the blower 44 can be activated to flow air 38, 48 into the inlet 40. The dehumidification system 10 can be activated responsive to the relative humidity 64 (RH) inside the vehicle 24 of about 70%. This value can be considered the lowest humidity value at which the dew point is enough for condensation to occur at an average temperature of approximately 70 degrees Fahrenheit (° F.) inside the vehicle 24. The dehumidification system 10 controller 62 can be activated via signals from the humidity sensor 60. The blower/fan 44 integrated in the system can be the only component energized during the dehumidification cycle. At step 114 the air 38 is directed through the sorbent bed 28. At step 116 the air 38, 48 is contacted with the dehumidification material 30. At step 118, the humidity 64 in the air 38 is reduced at the interior 26. Air 38 from inside the interior 26 can be fed into the sorbent-based dehumidifier bed 28 using the low parasitic blower/fan 44 at flow rates of up to 400 CFM until the relative humidity 64 (RH) inside the vehicle drops to 45-47%. This predetermined RH value can be utilized to avoid water condensation as the dew point is reduced under the vehicle 24 internal temperature, as well as to ensure guaranteed performance of materials, and avoid formation of mold and mildew. At step 120 the air is discharged through the outlet 42 into the interior 26. It is contemplated that the air 38, 48 can be recirculated through the dehumidification system 10 to ensure a predetermined interior humidity 64.

At step 122 the sorbent bed 28 can be regenerated. Regeneration of the sorbent bed 28 can be performed either at a pre-established operation interval (based on sorbent capacity and bed size) or at a pre-determined RH level (i.e., at night when the exterior humidity 65 is lower and the system is idle). Ambient air, during the driest part of the day, and/or when the air is detected to be below a predetermined RH level, can be used for regeneration or as make-up air. The substrate 32 is resistively heated to desorb the moisture. A small purge air flow 66 will be supplied by the blower/fan 44 (typically 10% of the air flow during the adsorption process) and the humid exhaust will be vented outside 46 of the vehicle through a series of actuated valves 68. In an exemplary embodiment, a single flap diverter 68 which utilizes a hinged flap designed to isolate either diverter outlet. The diverted flow 66 will be in the area of 20 CFM for about 20 minutes. The purge air flow 66 will be drawn through a membrane vent 70 that prevents environmental contaminants to enter the cabin (e.g., gore vent). Resistive heating of the sorbent bed 28 and blower 44 operation can be performed with power supplied from any available power source for example from a standard rechargeable battery coupled with solar tarps/panels 72 tethered on top of the vehicle 24. Any excess power could also be used to trickle charge the vehicle main-battery. The vehicle main-battery can also be used in lieu of a separate rechargeable battery.

Example 1

The substrate comprising MICROLITH brand mesh and a ceramic mesh were coated with molecular sieve 5A (MS5A) sorbent at a nominal loading on each mesh of 30 mg/in$^2$ and assembled to obtain a dehumidifier bed with a volume of approximately 15 in$^3$. The sorbent coated MICROLITH mesh was layered with sorbent coated ceramic mesh to prevent short-circuiting and affixed with electrode terminals for resistive heating with power supplied by the BB2590 battery and managed/controlled by a squad power manager.

The sorbent bed and the fan were placed inside an enclosure that was then placed within a chamber (to simulate the vehicle internal space). The chamber had a volume of several liters and was supplied with controlled humid air to achieve the targeted % RH. Balance of plant components included a BB2590 military ordinance battery to run the resistively heated bed, a squad power manager to measure and control power delivery through the system, an external heated water bath (outside the dehumidification system) to humidify the enclosure (simulate the environmental humidity), all necessary tuning and hardware and humidity and temperature sensors placed at different locations in the enclosure for accurate measurements. Power to the fan and the sorbent bed was supplied to the unit by a solar array consisting of two 115 W solar panels connected in series. The solar array was hybridized with a Military standard BB2590 rechargeable battery (rated 225 Wh), which was used to deliver auxiliary power through the squad power manager (SPM) to supplement the solar power and to operate the dehumidification system, such as its fan and to provide electrical power for sorbent bed regeneration by resistively heating the MICROLITH brand metal mesh (coated with the sorbent materials).

During regeneration, a small "purge" air flow was maintained through the system to effectively transport any moisture removed from the bed to the outside environment. Tests were performed with a starting RH of 90%-95% and a target "treated" humidity within the enclosure chamber of 45%. The initial humidity level was achieved by supplying humidified air using the external heated water bath to the enclosure while continuously monitoring the humidity (with the dehumidifier under "idle" condition). Once the humidity level was achieved, the fan was turned on at a relative speed of 72 L/min corresponding to a gas hourly space velocity in the sorbent bed of 18,000 h−1.

Regeneration of the bed was performed by restively heating the bed using power supplied either by the solar panel or by a BB2590 battery. The amount of power draw by the bed was monitored by a squad power manager (SPM). More than 30 operational cycles were completed at different conditions in order to optimize the operational protocols, sensors, controls, and energy consumption.

Example 2

In this scenario, we simulated the unattended operation of the dehumidifier system with several start-stop cycles. The humidity within the enclosure/chamber was brought to over 70% by introducing humidified air using the external heated water bath. The fan was started and then stopped when the humidity reached the 45% target followed by the re-humidification of the chamber (by introducing additional humid air) and subsequent cycle of de-humidification (fan on) was completed. No regeneration (or bed reconditioning) was performed in between these cycles. The regeneration process was completed when the system was no longer able to reduce the humidity to the required level. In total, 5 cycles were completed (4.5 hours operation using an initial 90% RH within the chamber; and will be longer with a lower initial % RH) before bed regeneration/reconditioning was needed.

A technical advantage of the dehumidification system 10 can be found in the method of delivering the air 38 to the surface of the sorbent bed 28. The substrate 32 includes the layered mesh 34 that encompasses a high surface area per unit volume for contact with the humid air 38. Due to the multiple layer 33 configuration of the sorbent-coated mesh 34, a high surface area of sorbent material 56 increases the contact surface of the humid air 38 with the dehumidification material 30.

Another technical advantage of the dehumidification system 10 includes a sorbent bed that includes layers of sorbent-coated MICROLITH brand metal mesh which can be restively heated alternating with layers of ceramic mesh 35 for insulation to prevent electrical short circuits.

Another technical advantage of the dehumidification system 10 includes the ceramic mesh 35 also being coated with sorbent 30 available during the adsorption/desorption process.

Another technical advantage of the dehumidification system 10 includes the sorbent bed, fan, valves and controls that can be housed in any type of enclosure but more preferably a mold and mildew resistant enclosure, as for example a PELICAN™ box.

Another technical advantage of the dehumidification system 10 includes a novel photovoltaic-powered, high efficiency and low-power regenerable dehumidification system for military vehicles (Stryker/Humvee, Abrams/Bradley). The system is unmanned and can actively control humidity inside the vehicle to prevent negative effects such as corrosion, mold and fungal growth. The system can be operated under carbon-neutral condition, utilizing solar power renewable energy with an energy storage device.

A dehumidification process and system has been provided. While the dehumidification process and device has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

The invention claimed is:

1. A dehumidification system comprising:
    an enclosure having sidewalls, said sidewalls defining a cavity;
    said inlet an inlet fluidly coupled to said cavity, configured to receive air into said cavity;
    an outlet fluidly coupled to said cavity, said outlet configured to discharge said air from said cavity;
    a sorbent bed located within said cavity fluidly coupled to said inlet and said outlet; said sorbent bed comprising a substrate with dehumidification materials attached to said substrate and an insulator coupled to said substrate;
    blower fluidly coupled to said inlet and said outlet, said blower configured to transfer air from said inlet through said sorbent bed and out said outlet; and
    a rechargeable power source electrically coupled to said substrate configured to electrically heat said substrate to a predetermined temperature configured to regenerate said sorbent bed, wherein said rechargeable power source is configured to charge a vehicle battery responsive to a demand for power to the substrate for resistive heating.

2. The dehumidification system according to claim 1, wherein said dehumidification materials are configured to dehumidify air.

3. The dehumidification system according to claim 1, wherein said dehumidification materials comprise sorbent materials configured for removing moisture from air.

4. The dehumidification system according to claim 1, wherein said substrate comprises at least one of a mesh and a nano fiber support and combinations thereof.

5. The dehumidification system according to claim 1, wherein said insulator comprises said dehumidification material.

6. The dehumidification system according to claim 1, wherein said substrate comprises an ultra-short-channel-length metal substrate.

7. The dehumidification system according to claim 1, wherein said rechargeable power source comprises a rechargeable battery coupled with a solar tarp or a solar panel.

8. A vehicle equipped with a dehumidification system comprising:
    a vehicle comprising a cabin, said cabin defining an interior and an exterior;
    an enclosure having sidewalls, said sidewalls defining a cavity;
    an inlet fluidly coupled to said cavity, said inlet configured to receive air into said cavity from at least one of said interior of said cabin and said exterior of said cabin;
    an outlet fluidly coupled to said cavity, said outlet configured to discharge said air from said cavity into said cabin interior;
    a sorbent bed located within said cavity fluidly coupled to said inlet and said outlet; said sorbent bed comprising a substrate with dehumidification material attached to said substrate and an insulator coupled to said substrate;
    a blower fluidly coupled to said inlet and said outlet, said blower configured to transfer said air from said inlet through said sorbent bed and out said outlet; and
    a rechargeable power source electrically coupled to said substrate configured to electrically heat said substrate to a predetermined temperature configured to regenerate said sorbent bed, wherein said rechargeable power source is configured to charge a vehicle battery responsive to a demand for power to the substrate for resistive heating.

9. The vehicle equipped with a dehumidification system according to claim 8, wherein said dehumidification materials comprise sorbent material.

10. The vehicle equipped with a dehumidification system according to claim 8, wherein said substrate comprises layers of at least one of a mesh and a nano fiber support and combinations thereof.

11. The vehicle equipped with a dehumidification system according to claim 8, further comprising:
   a controller coupled to said blower and said substrate, said controller configured to receive signals from at least one of a humidistat and a thermocouple.

12. The vehicle equipped with a dehumidification system according to claim 8, wherein said substrate comprises an ultra-short-channel-length metal substrate.

13. The vehicle equipped with a dehumidification system according to claim 8, wherein said rechargeable power source comprises a rechargeable battery coupled with a solar tarp or a solar panel.

14. A process for dehumidification of a space comprising:
   fluidly coupling a dehumidification system to said space, said dehumidification system comprising:
      an enclosure having sidewalls, said sidewalls defining a cavity;
      an inlet fluidly coupled to said cavity, said inlet configured to receive air into said cavity;
      an outlet fluidly coupled to said cavity, said outlet configured to discharge said air from said cavity into said space;
      a sorbent bed located within said cavity fluidly coupled to said inlet and said outlet; said sorbent bed comprising a substrate with dehumidification material attached to said substrate and an insulator coupled to said substrate;
      a blower fluidly coupled to said inlet and said outlet, said blower configured to transfer said air from said inlet through said sorbent bed and out said outlet into said space; and
      a rechargeable power source electrically coupled to said substrate, wherein said rechargeable power source is configured to charge a vehicle battery responsive to a demand for power to the substrate for resistive heating;
   activating said blower;
   directing said air through said sorbent bed;
   contacting said air with said dehumidification material;
   removing humidity contained in said air; and
   discharging said air from said outlet into said space.

15. The process of claim 14, wherein said dehumidification materials comprise sorbent materials.

16. The process of claim 14, wherein said substrate comprises at least one of a mesh and a nano fiber support and combinations thereof.

17. The process of claim 14, wherein said substrate comprises an ultra-short-channel-length metal substrate.

18. The process of claim 14, further comprising:
   regenerating said sorbent bed by resistively heating said substrate and purging a portion of said moisture laden air to an exterior of said space.

19. The process of claim 18, wherein said regenerating said sorbent bed comprises utilizing exterior air, during the driest part of the day and/or when the air is detected to be below a predetermined RH level, for regeneration or as make-up air.

20. The process of claim 14, further comprising:
   electrically heating said substrate, to a predetermined temperature responsive to a predetermined relative humidity in said space, with the regenerable power source electrically coupled to said substrate.

21. The process of claim 14, wherein said space is selected from the group consisting of a vehicle cabin, a ship cabin, and an aircraft cabin.

\* \* \* \* \*